(12) United States Patent
Chadha et al.

(10) Patent No.: US 8,379,076 B2
(45) Date of Patent: Feb. 19, 2013

(54) SYSTEM AND METHOD FOR DISPLAYING A MULTIPOINT VIDEOCONFERENCE

(75) Inventors: Tejbans Singh Chadha, Fremont, CA (US); Anurag Dhingra, San Jose, CA (US); David Nicholas Bieselin, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1347 days.

(21) Appl. No.: 11/970,391

(22) Filed: Jan. 7, 2008

(65) Prior Publication Data

US 2009/0174764 A1   Jul. 9, 2009

(51) Int. Cl.
*H04N 7/14* (2006.01)

(52) U.S. Cl. .................................. 348/14.09; 348/14.08

(58) Field of Classification Search .... 348/14.01–14.16; 379/201.01, 202.01; 370/260–271
See application file for complete search history.

(56) References Cited

U.S. PATENT DOCUMENTS

| | | | |
|---|---|---|---|
| 4,400,724 A | 8/1983 | Fields | 358/85 |
| 4,494,144 A | 1/1985 | Brown | 348/420.1 |
| 4,961,211 A | 10/1990 | Tsugane et al. | 379/54 |
| 4,965,819 A | 10/1990 | Kannes | 348/14.07 |
| 5,272,526 A | 12/1993 | Yoneta et al. | 348/14.1 |
| 5,491,797 A | 2/1996 | Thompson et al. | 395/200.03 |
| 5,508,733 A | 4/1996 | Kassatly | 348/13 |
| 5,541,639 A | 7/1996 | Takatsuki et al. | 348/15 |
| 5,673,256 A | 9/1997 | Maine | 370/271 |
| 5,675,374 A | 10/1997 | Kohda | 348/15 |
| 5,737,011 A | 4/1998 | Lukacs | 348/15 |
| 5,751,337 A | 5/1998 | Allen et al. | 348/14.07 |
| 5,790,179 A | 8/1998 | Shibata et al. | 348/15 |
| 5,801,756 A | 9/1998 | Iizawa | 348/14.11 |
| 5,802,294 A | 9/1998 | Ludwig et al. | 709/204 |
| 5,903,637 A | 5/1999 | Hogan et al. | 379/203.01 |
| 6,025,870 A | 2/2000 | Hardy | 348/15 |
| 6,049,694 A | 4/2000 | Kassatly | 455/6.1 |
| 6,172,703 B1 | 1/2001 | Lee | 348/15 |
| 6,178,430 B1 | 1/2001 | Cohen et al. | 707/501 |
| 6,317,776 B1 | 11/2001 | Broussard et al. | |
| 6,346,962 B1 | 2/2002 | Goodridge | 348/14.05 |
| 6,396,531 B1 | 5/2002 | Gerszberg et al. | 348/14.1 |
| 6,577,807 B1 | 6/2003 | Yaegashi et al. | 386/52 |
| 6,611,503 B1 | 8/2003 | Fitzgerald et al. | 370/260 |
| 6,710,797 B1 | 3/2004 | McNelley et al. | 348/14.16 |
| 6,711,212 B1 | 3/2004 | Lin | 375/240.24 |
| 6,757,277 B1 | 6/2004 | Shaffer et al. | 370/356 |

(Continued)

OTHER PUBLICATIONS

First Office Action issued by the State Intellectual Property Office of the People's Republic of China; Application No. 200780007846.6; Serial No. 2010060800498250, Date of Issue Jun. 11, 2010.

(Continued)

*Primary Examiner* — Brian Ensey

(74) *Attorney, Agent, or Firm* — Baker Botts L.L.P.

(57) ABSTRACT

A method for displaying a multipoint videoconference includes receiving a plurality of video signals generated at a plurality of remote conference sites. The method includes assigning a plurality of video signals generated at a first remote conference site to a first monitor of a plurality of monitors at a local site and assigning a plurality of video signals generated at a second remote conference site to a second monitor of the plurality of monitors at the local site. In addition, the method includes selecting, for each of the first and second monitor, a video signal of the plurality of video signals assigned to the monitor, and displaying each selected video signal on its respective monitor.

25 Claims, 2 Drawing Sheets

U.S. PATENT DOCUMENTS

| | | | | |
|---|---|---|---|---|
| 6,774,927 | B1 | 8/2004 | Cohen et al. | 348/14.1 |
| 6,775,247 | B1 | 8/2004 | Shaffer et al. | 370/260 |
| 6,795,108 | B2 | 9/2004 | Jarboe et al. | 348/14.09 |
| 6,798,441 | B2 | 9/2004 | Hartman et al. | 348/14.08 |
| 6,882,358 | B1 | 4/2005 | Schuster et al. | 348/14.16 |
| 6,886,036 | B1 | 4/2005 | Santamaki et al. | 709/223 |
| 6,922,718 | B2 | 7/2005 | Chang | 709/204 |
| 6,981,047 | B2 | 12/2005 | Hanson et al. | 709/227 |
| 6,989,836 | B2 | 1/2006 | Ramsey | 345/522 |
| 6,989,856 | B2 | 1/2006 | Firestone et al. | 348/14.09 |
| 6,992,702 | B1 | 1/2006 | Foote et al. | 348/211.8 |
| 6,999,829 | B2 | 2/2006 | Bazzocchi et al. | 700/99 |
| 7,027,659 | B1 | 4/2006 | Thomas | 382/254 |
| 7,038,588 | B2 | 5/2006 | Boone et al. | 340/573 |
| 7,039,027 | B2 | 5/2006 | Bridgelall | 370/329 |
| 7,043,528 | B2 | 5/2006 | Schmitt et al. | 709/204 |
| 7,050,425 | B2 | 5/2006 | Richter et al. | 370/352 |
| 7,054,268 | B1 | 5/2006 | Paranteinen et al. | 370/231 |
| 7,057,636 | B1 | 6/2006 | Cohen-Solal et al. | 348/14.08 |
| 7,068,299 | B2 | 6/2006 | Lemieux et al. | 348/14.03 |
| 7,080,105 | B2 | 7/2006 | Nakanishi et al. | 707/204 |
| 7,085,786 | B2 | 8/2006 | Carlson et al. | 707/204 |
| 7,092,002 | B2 | 8/2006 | Ferren et al. | 348/14.08 |
| 7,111,045 | B2 | 9/2006 | Kato et al. | 709/205 |
| 7,151,758 | B2 | 12/2006 | Kumaki et al. | 370/331 |
| 7,154,526 | B2 | 12/2006 | Foote et al. | 348/14.08 |
| 7,203,904 | B2 | 4/2007 | Lee | 715/717 |
| 7,245,272 | B2 | 7/2007 | Shiuan et al. | 345/2.2 |
| 7,256,822 | B2 | 8/2007 | Suga et al. | 348/211.3 |
| 7,277,117 | B2 | 10/2007 | Takashima et al. | 348/14.09 |
| 7,515,174 | B1 * | 4/2009 | Francisco et al. | 348/14.16 |
| 7,532,232 | B2 | 5/2009 | Shah et al. | 348/14.09 |
| 7,605,837 | B2 * | 10/2009 | Yuen et al. | 348/14.16 |
| 2002/0099682 | A1 | 7/2002 | Stanton | 707/1 |
| 2002/0103864 | A1 | 8/2002 | Rodman et al. | 709/204 |
| 2003/0021400 | A1 | 1/2003 | Grandgent et al. | 379/202.01 |
| 2003/0071890 | A1 | 4/2003 | McClure | 348/14.03 |
| 2003/0101219 | A1 | 5/2003 | Kondo et al. | |
| 2003/0149724 | A1 | 8/2003 | Chang | 709/204 |
| 2004/0004942 | A1 | 1/2004 | Nebiker et al. | 270/260 |
| 2004/0010464 | A1 | 1/2004 | Boaz | 705/40 |
| 2004/0015551 | A1 | 1/2004 | Thornton | |
| 2005/0024484 | A1 | 2/2005 | Leonard et al. | 348/14.1 |
| 2005/0030255 | A1 | 2/2005 | Chiu et al. | |
| 2005/0099492 | A1 | 5/2005 | Orr | |
| 2005/0248652 | A1 | 11/2005 | Firestone et al. | 348/14.09 |
| 2005/0260976 | A1 | 11/2005 | Khartabil et al. | 455/416 |
| 2006/0041571 | A1 | 2/2006 | Kubokawa | 707/101 |
| 2006/0066717 | A1 | 3/2006 | Miceli | 348/14.09 |
| 2006/0129626 | A1 | 6/2006 | Fitzpatrick | 709/200 |
| 2006/0152575 | A1 | 7/2006 | Amiel et al. | 348/14.01 |
| 2006/0158509 | A1 | 7/2006 | Kenoyer et al. | 348/14.08 |
| 2006/0168302 | A1 | 7/2006 | Boskovic et al. | 709/231 |
| 2006/0200518 | A1 | 9/2006 | Sinclair et al. | 709/204 |
| 2006/0251038 | A1 | 11/2006 | Tamura et al. | 370/342 |
| 2006/0259193 | A1 | 11/2006 | Wang et al. | 700/245 |
| 2006/0264207 | A1 | 11/2006 | Tamura et al. | 455/415 |
| 2007/0070940 | A1 | 3/2007 | Vander Veen et al. | 370/328 |
| 2007/0115348 | A1 | 5/2007 | Eppel et al. | 348/14.08 |
| 2007/0115919 | A1 | 5/2007 | Chahal et al. | 370/352 |
| 2007/0172045 | A1 | 7/2007 | Nguyen et al. | 379/202.01 |
| 2007/0250567 | A1 | 10/2007 | Graham et al. | 709/204 |
| 2007/0250568 | A1 | 10/2007 | Dunn et al. | 709/204 |
| 2007/0263081 | A1 * | 11/2007 | De Beer et al. | 348/14.08 |
| 2008/0062625 | A1 | 3/2008 | Batio | 361/680 |
| 2009/0213207 | A1 | 8/2009 | Shah et al. | 348/14.09 |

OTHER PUBLICATIONS

The Second Office Action; Application No. 200780013978.X; Serial No. 2011072900618410, Aug. 3, 2011.

Communication from State IP Office of the People's Republic of China, First Office Action regarding Application #200780013988.3, Serial # 2010050500459610, Cisco Technology, Inc., May 10, 2010.

Graham, et al., U.S. Appl. No. 11/483,796, filed Jul. 10, 2006, Non-final Office Action mailed Jun. 17, 2010.

First Office Action issued by the State Intellectual Property Office of the People's Republic of China; Application No. 200780013978.X; Serial No. 2010060800493010, Date of Issue Jun. 11, 2010.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

The Second Office Action dated Jun. 29, 2011 from The Patent Office of the People's Republic of China, re Application 200780013988.3 (Serial No. 2011062600047350), Jun. 29, 2011.

Graham et al., U.S. Appl. No. 11/483,796, filed Jul. 10, 2006, Final Office Action from the U.S. Patent and Trademark Office mailed Nov. 26, 2010.

Dunn et al., U.S. Appl. No. 11/483,864, filed Jan. 7, 2008, Communication from U.S. Patent and Trademark Office mailed Jan. 9, 2008.

Dunn et al., U.S. Appl. No. 11/483,864, filed Jan. 7, 2008, Communication from U.S. Patent and Trademark Office mailed May 21, 2008.

Dunn et al., U.S. Appl. No. 11/483,864, filed Jan. 7, 2008, Communication from U.S. Patent and Trademark Office mailed Oct. 15, 2008.

Graham et al., U.S. Appl. No. 11/483,796, filed Jul. 10, 2006, Communication from U.S. Patent and Trademark Office mailed Jun. 24, 2008.

Graham et al., U.S. Appl. No. 11/483,796, filed Jul. 10, 2006, Communication from U.S. Patent and Trademark Office mailed Dec. 1, 2008.

Graham et al., U.S. Appl. No. 11/483,796, filed Jul. 10, 2006, Communication from U.S. Patent and Trademark Office mailed Jun. 12, 2009.

Lambert, *Polycom Video Communications*, © 2004 Polycom, Inc., 4 pages, 2004.

PCT Notification of Transmittal of the International Search Report and the Written Opinion of the Intl. Searching Authority, re Application No. PCT/US07/09514, dated Oct. 1,2008, 11 pages.

Office Action Summary issued by the USPTO dated Aug. 25, 2011; U.S. Appl. No. 12/463,519; filed May 11, 2009.

European Search Report; Reference P32631EP-PCT; 07775604.7-1241/2011058; PCT/US2007009388; 7 pages, May 4, 2012.

Non-Final Office Action issued by the USPTO dated Dec. 29, 2011; U.S. Appl. No. 12/463,519, filed May 11, 2009; 7 pages.

The Third Office Action issued by the Patent Office of the People's Republic of China; Application No. 200780013978.X; Serial No. 2012031500760160, Mar. 20, 2012.

Office Action Summary issued by the USPTO for U.S. Appl. No. 11/483,796, filed Jul. 10, 2006, Jan. 14, 2010.

Office Action Summary issued by the USPTO for U.S. Appl. No. 11/483,796, filed Jul. 10, 2006, Mar. 16, 2012.

Weinstein, et al., Emerging Technologies for Teleconferencing and Telepresence, *Wainhouse Research*, 54 pages, Sep. 2005.

Stillerman, *A Look Inside H.239*, www.ihets.org, 3 pages, Sep. 2004.

Davis, Video Communications Industry Backgrounder, *Wainhouse Research*, www.tandberg.net, 4 pages, Aug. 15, 2006.

Communication from State IP Office of the People's Republic of China, The Second Office Action regarding Application #20078007846.6, Cisco Technology, Inc., Received Feb. 20, 2012.

The Third Office Action issued by the Patent Office of the People's Republic of China; Application No. 200780013988.3; Serial No. 2012040900790020, dated Apr. 12, 2012.

Rejection Decision received from The Patent Office of the People's Republic of China for Application No. 200780013988.3; Serial No. 2012092800797040, Oct. 9, 2012.

* cited by examiner

US 8,379,076 B2

SYSTEM AND METHOD FOR DISPLAYING A MULTIPOINT VIDEOCONFERENCE

TECHNICAL FIELD

This disclosure relates generally to the field of telecommunications and more specifically to a system and method for displaying a multipoint videoconference.

BACKGROUND

There are many methods available for groups of individuals to engage in conferencing. One common method, videoconferencing, involves the use of video equipment, such as cameras, microphones, displays and speakers. The equipment may be used to divide a conference site into segments associated with one or more conference participants. In particular, a camera and a microphone may generate a video signal and an audio signal, respectively, associated with a particular segment. When a remote location has more segments than the local location has displays, individuals at the local location may have an artificial and unrealistic experience during the videoconference. Correspondingly, individuals at the local location may have a diminished experience if the aggregate number of segments at several remote locations outnumbers the monitors at the local location due to continuous switching among the signals from the cameras.

To address such problems, certain systems employ various metrics to determine how or where a video image is displayed. For example, some videoconference systems will only present one video signal at a time on a monitor. In these videoconference systems the video signal that is presented within the display is usually determined by voice activity (e.g., the last person to talk is the one that is presented). Some videoconference systems support multiple monitors where the displayed video signals may be switched according to site. More particularly, each of the local monitors may display video signals associated with the site of the current active speaker. Thus, if the active speaker is in New York, then each of the local monitors will display video signals associated with the segments at the New York site. Site switching may be inefficient and visually unappealing as each remote site will typically only have a single active speaker. Thus, continuous switching between displayed sites may detract from a user's conferencing experience. In other systems, the displayed video signal may switch by segment. In these systems, each segment may be separately analyzed to determine an active speaker. The set of displayed video signals may include the active video signals for each respective segment irrespective of the segment's site location. Switching by segment may detract from a local user's conference experience as the user may lose track of the site associated with a particular speaker.

BRIEF DESCRIPTION OF THE DRAWINGS

For a more complete understanding of the disclosure and its features and advantages, reference is now made to the following description, taken in conjunction with the accompanying drawings, in which.

DESCRIPTION OF EXAMPLE EMBODIMENTS

Overview

In accordance with a particular embodiment, a method for displaying a multipoint videoconference, includes receiving a plurality of video signals generated at a plurality of remote conference sites. The method includes assigning a plurality of video signals generated at a first remote conference site to a first monitor of a plurality of monitors at a local site and assigning a plurality of video signals generated at a second remote conference site to a second monitor of the plurality of monitors at the local site. In addition, the method includes selecting, for each of the first and second monitor, a video signal of the plurality of video signals assigned to the monitor, and displaying each selected video signal on its respective monitor.

In another embodiment, the method includes receiving a plurality of audio signals generated at the plurality of remote sites, wherein each of the plurality of audio signals associated with at least one of the plurality of video signals. The method also includes assigning a plurality of audio signals generated at the first remote site to a first loudspeaker associated with the first monitor and assigning a plurality of audio signals generated at the second remote site to a second loudspeaker associated with the second monitor. Additionally, the method includes broadcasting one or more of the assigned audio signals.

Also provided is a system for displaying a multipoint videoconference that includes an interface is operable to receive a plurality of video signals generated at a plurality of remote conference sites. The system also includes a plurality of monitors at a local site which are operable to display one or more of the plurality of video signals. Also included is a processor coupled to the interface and operable to assign a plurality of video signals generated at a first remote conference site to a first monitor of the plurality of monitors at the local site. The processor is functional to assign a plurality of video signals generated at a second remote conference site to a second monitor of the plurality of monitors at the local site. In addition, the processor may select, for each of the first and second monitor, a video signal of the plurality of video signals assigned to the monitor and display each selected video signal on its respective monitor.

Description

Figure 1:
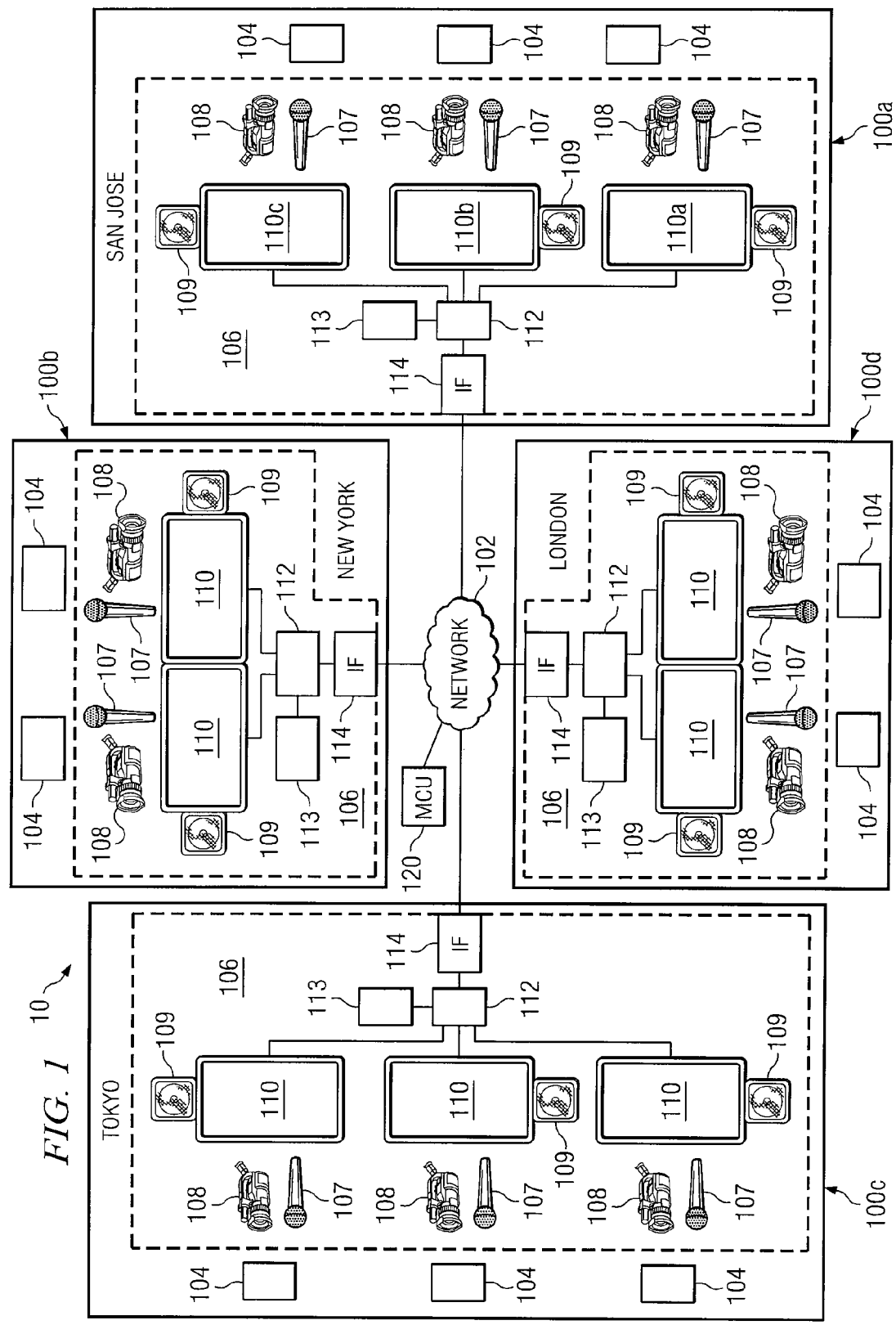
FIG. 1 is a block diagram illustrating a system for conducting a conference between a plurality of remote locations in accordance with an embodiment.

FIG. 1 is a block diagram illustrating a communication system 10 for conducting a conference between a plurality of remote locations. The illustrated embodiment includes a communication network 102 that may support conferencing between remotely located sites 100 using conference equipment 106. Sites 100 may include any suitable number of users 104 that participate in a videoconference. Also illustrated is a multipoint control unit (MCU) 120 which facilitates the communication of audio and/or video signals between sites 100 while engaged in a conference. As used herein, a "conference" may include any communication session between a plurality of users transmitted using any audio and/or video means, including signals, data or messages transmitted through voice and/or video devices, text chat, and instant messaging.

Communication network 102 represents communication equipment, including hardware and any appropriate controlling logic for interconnecting elements coupled to communication network 102. In general, communication network 102 may be any network capable of transmitting audio and/or video telecommunication signals, data, and/or messages, including signals, data, or messages transmitted through text chat, instant messaging, and e-mail. Accordingly, communication network 102 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. Additionally, communication network 102 may represent any hardware and/or software configured to communicate information in the form of packets, cells, frames, segments or other portions of data. To facilitate the described communication capabilities, communication network 102 may include routers, hubs, switches, gateways, call controllers, and or any other suitable components in any suitable form or arrangements. Although communication network 102 is illustrated as a single network, communication network 102 may include any number or configuration of networks. Moreover, communication system 10 may include any number or configuration of communication networks 102.

MCU 120 acts as an intermediary during a multipoint communication conference. In particular, MCU 120 may collect audio and/or video signals transmitted by conference participants through their endpoints and distribute such signals to other participants of the multipoint conference at remote sites 100. Additionally, MCU 120 may assign particular audio and/or video signals to particular monitors 110 at a remote site 100. MCU 120 may include any bridging or switching device used in support of multipoint conferencing, including videoconferencing. In various embodiments, MCU 120 may be configured to support any number of conference endpoints communicating on any number of conferences, simultaneously. MCU 120 may be in the form of customer provided equipment (CPE, e.g., beyond the network interface) or may be embedded in a network such as network 102.

User 104 represents one or more individuals or groups of individuals who may be present for the videoconference. Users 104 participate in the videoconference using any suitable device and/or component, such as audio Internet Protocol (IP) phones, video phone appliances, personal computer (PC) based video phones, and streaming clients. During the videoconference, users 104 may engage in the session as speakers or participate as non-speakers.

Conference equipment 106 facilitates videoconferencing among users 104. Conference equipment 106 may establish the videoconference session using any suitable technology and/or protocol, such as Session Initiation Protocol (SIP) or H.323. Additionally, equipment 106 may support and be interoperable with other video systems supporting other standards, such as H.261, H.263, and/or H.264. Conference equipment 106 may include any suitable elements to establish and facilitate the videoconference. For example, conference equipment 106 may include user interfaces, controllers, microphones, or a speakerphone. In the illustrated embodiment, conference equipment 106 includes microphones 107, cameras 108, loudspeakers 109, monitors 110, processor 112, memory module 113, and network interface 114.

Microphones 107 may be any acoustic to electric transducer or sensor operable to convert sound into an electrical signal. For the purposes of communication system 10, microphone 107 may capture the voice of a user at a local site 100 and transform it into an audio signal for transmission to a remote site 100. While in the illustrated embodiment, there is a microphone 108 for each user 104 a particular site 100 may have more or less microphones than users 104. Additionally, in certain embodiments microphones 107 may be combined with any other component of conference equipment 106 such as, for example, cameras 108.

Cameras 108 may include any suitable hardware and/or software to facilitate capturing an image of user 104 and the surrounding area as well as providing the image to other users 104. The area captured by a particular camera 108 may be referred to as a "segment." Thus, as illustrated in FIG. 1, site 100*b* has two segments and site 100*c* has three segments. In certain embodiments, cameras 108 may capture and transmit the image of user 104 as a video signal (e.g. a high definition video signal). Depending on the embodiment, the video signal transmitted may include a separate signal (e.g., each camera 108 transmits its own signal) or a combined signal (e.g., the signal from multiple sources are combined into one video signal).

Loudspeakers 109 may be an electromechanical device that converts an audio signal generated by a microphone 107 into sound. In particular, loudspeakers 109 may locally broadcast the voice of a remote user 104 speaking during a conference. While the illustrated embodiment indicates that there is a loudspeaker 109 for each user 104, a particular site 100 may have more or less loudspeakers than users 104. Additionally, in certain embodiments loudspeakers 109 may be combined with any other component of conference equipment 106 such as, for example, monitors 110.

Monitors 110 may include any suitable hardware and/or software to facilitate receiving a video signal and displaying the image of a user 104 to other users 104. For example, monitors 110 may include a notebook PC, a wall mounted monitor, a floor mounted monitor, or a free standing monitor. Monitors 110 may display the image of user 104 using any suitable technology that provides a realistic image, such as high definition, high-power compression hardware, and efficient encoding/decoding standards.

Interface 114 communicates information and signals to and receives information and signals from network 102. Interface 114 represents any port or connection, real or virtual, including any suitable hardware and/or software that allow conference equipment 106 to exchange information and signals with network 102, other conference equipment 106, and/or other elements of communication system 10.

Processor 112 controls the operation and administration of conference equipment 106 by processing information and signals received from cameras 108 and interfaces 114. Processor 112 may include any suitable hardware, software, or both that operate to control and process signals. Examples of processor 112 include, but are not limited to, application-specific integrated circuits (ASICs), field-programmable gate arrays (FGPAs), digital signal processors (DSPs), and any other suitable specific or general purpose processors.

Memory 113 may store any data or logic used by processor 112 in providing videoconference functionality. In some embodiments memory 113 may store all, or a portion, of a videoconference. Memory 113 may include any form of volatile or non-volatile memory including, without limitation, magnetic media, optical media, random access memory (RAM), read-only memory (ROM), removable media, or any other suitable local or remote memory component.

In operation, conference equipment 106, communication network 102, and MCU 120, may function together to facilitate a videoconference among users 104. When users 104 join the conference, a video signal is generated by each camera 109 and is assigned to a monitor 110. Likewise, an audio signal generated by a microphone 107 may be assigned to a loudspeaker 109. The microphone 107 which generated the audio signal may be associated with the same segment as the camera 108 which generated the video signal. Similarly, the assigned loudspeaker 109 may be associated with the assigned monitor 110. The signal assignments may be made remotely by MCU 120 which may analyze data transmitted in the audio and/or video signals which provides routing information. Alternatively, the assignment may be made locally by processor 112. These assignments may persist for the duration of the conference. Thus, a remote user may always be displayed on the same local monitor. This may make it easier for local users to identify who and where the remote user is positioned.

In certain situations, a monitor 110 and/or a loudspeaker 109 at a local site 100 may have more than one assigned signal. Accordingly, with respect to video signals, a monitor may switch between displaying assigned video signals based on, for example, which user last spoke or which user is currently speaking the loudest. Thus, as various users 104 speak during the conference, the video signal displayed on each monitor 110 may change to display the image of the last speaker. Regarding audio signals, the assigned speaker may broadcast multiple signals at one time. Therefore, a user at a local site 102 may still hear the voice of a remote speaker even though the local monitor 110 may not simultaneously display the segment associated with the remote speaker.

In an example embodiment of operation, each video signal generated by a camera 108 at a remote site 100 may be assigned to the same monitor 110 at a local site. To illustrate, assume that sites 100a-100d are located in San Jose, New York, Tokyo, and London, respectively. When users 104 at New York site 100b join the conference, each of the video signals corresponding to the multiple segments at New York site 100b may be assigned to monitor 110a at San Jose site 100a. When users 104 at Tokyo site 100c join the conference, each of the signals may be assigned to monitor 110b at San Jose site 100a. Correspondingly, when users 104 at London site 100d join the conference each of the signals may be assigned to monitor 110c at San Jose site 100a. Similar signal assignments may be made locally for New York site 100b, Tokyo site 100c, and London site 100d. Accordingly, the signals may be assigned by site as opposed to segment (i.e. where a remote user 104 is positioned at his/her respective site). Assigning video signals based on site may provide a user 104 with a sense of orientation whereby a certain monitor corresponds to a specific remote site 100.

Continuing with the above example, situations may arise where there are more remote sites 100 participating in a conference than there are local monitors 110. In such circumstances, signals may still be assigned according to the above described scheme. Therefore, if a fifth site in Dallas, Tex. joins the conference, then the video signals from the site may all be assigned, for example, to monitor 110a at San Jose site 100a. Accordingly, monitor 110a at San Jose site 100a may have all the video signals from New York site 100b and all of the video signals from the Dallas site assigned thereto. The segment displayed by monitor 110a may still be switched according to the active speaker at the site associated with the segment. If there is an active speaker at more than one site assigned to a particular monitor, then the segment displayed may be selected based on any number of suitable criteria. For instance, if a user in Dallas and a user in New York are each speaking, then monitor 110a may display the segment associated with the user who has been speaking for the longest amount of time. Thus, when a remote user temporarily interrupts another remote user, the monitor may continue to display the segment associated with the original speaker. Alternatively, the displayed segment may be the one associated with the remote user who spoke last or is currently speaking the loudest. While specific switching parameters have been described, any number of suitable switching schemes for displaying remote segments may be employed.

In a particular embodiment, policies may be employed with respect to assigning remote sites 102 to a local monitor 110. For instance, remote sites 102 may be assigned a monitor 110 by rank. To illustrate, New York may be the location of the Chief Executive Officer (CEO) of a company. Thus, New York site 100b may be assigned to center monitor 110b at San Jose site 100a to provide local users 104 with a better view of the CEO. In certain embodiments, the policy may be a system wide policy (i.e. New York site 100b is always positioned at the center monitor), a conference specific policy (i.e. for the particular conference session), and/or a site specific policy (i.e. San Jose site 100a elects to have New York site 100b assigned to the center monitor). Another policy may dictate that a higher priority site, such as New York site 100b, be the last site to share a monitor 110 with one or more other sites or be the site 100 to share a monitor with the fewest number of other sites 100. In certain embodiments, the described policies may be enforced by MCU 120 and/or processor 112.

As mentioned, the audio signals may be assigned to a loudspeaker 109 associated with the monitor 110 which displays the segment associated with a particular remote user 104. Accordingly, the audio segment may be fixed with the video segment for the site. To illustrate, if the video signals from New York site 102b are assigned to monitor 110a at San Jose site 100a, then the audio signals generated by microphones 107 at New York site 100b may be assigned to loudspeaker 109a which may be associated with monitor 110a. Assigning the audio signals in such a manner may enhance the conferencing experience for local users 104 at San Jose site 100a by producing an environment where the remote user 104 is speaking directly at the local user 104.

To further enhance the conferencing experience for a local user, switching algorithms or broadcasting policies may be employed with respect to the broadcasted audio signals. For example, a particular loudspeaker 109 may mix and broadcast all of the assigned audio signals simultaneously. Thus, a local user may hear communications from a given remote user even though the image of the remote user may not be displayed on an associated monitor. For example, assume that the segments at New York site 100b and Tokyo site 100c are assigned to loudspeaker 109a at San Jose site 100a. In this situation, loudspeaker 109a may mix and simultaneously broadcast the audio signals from each of the remote segments. In a particular embodiment, a switching algorithm may be employed which amplifies the audio signal associated with the segment corresponding to the remote user 104 that is the active speaker. In addition to or alternatively, the switching algorithm may mute the audio signals of the segments not associated with the active speaker. To facilitate the switching, an indicator may be displayed on a local monitor for a particular segment indicating to the local user that the audio and/or video signal is being broadcasted or displayed remotely. As with the video switching policies, the audio switching policies and algorithms may be system specific, site specific, and/or conference specific. In addition, such policies and algorithms may be implemented by MCU 120 and/or processor 112.

Modifications, additions, or omissions may be made to communication system 10. For example, communication system 10 may include any suitable number of sites 100 and may facilitate a videoconference between any suitable number of sites 100. As another example, sites 100 may include any suitable number of microphones 107, cameras 108, loudspeakers 109, and monitors 110 to facilitate a videoconference. Accordingly, the operations of communication system 10 may be performed by more, fewer, or other components.

Figure 2:
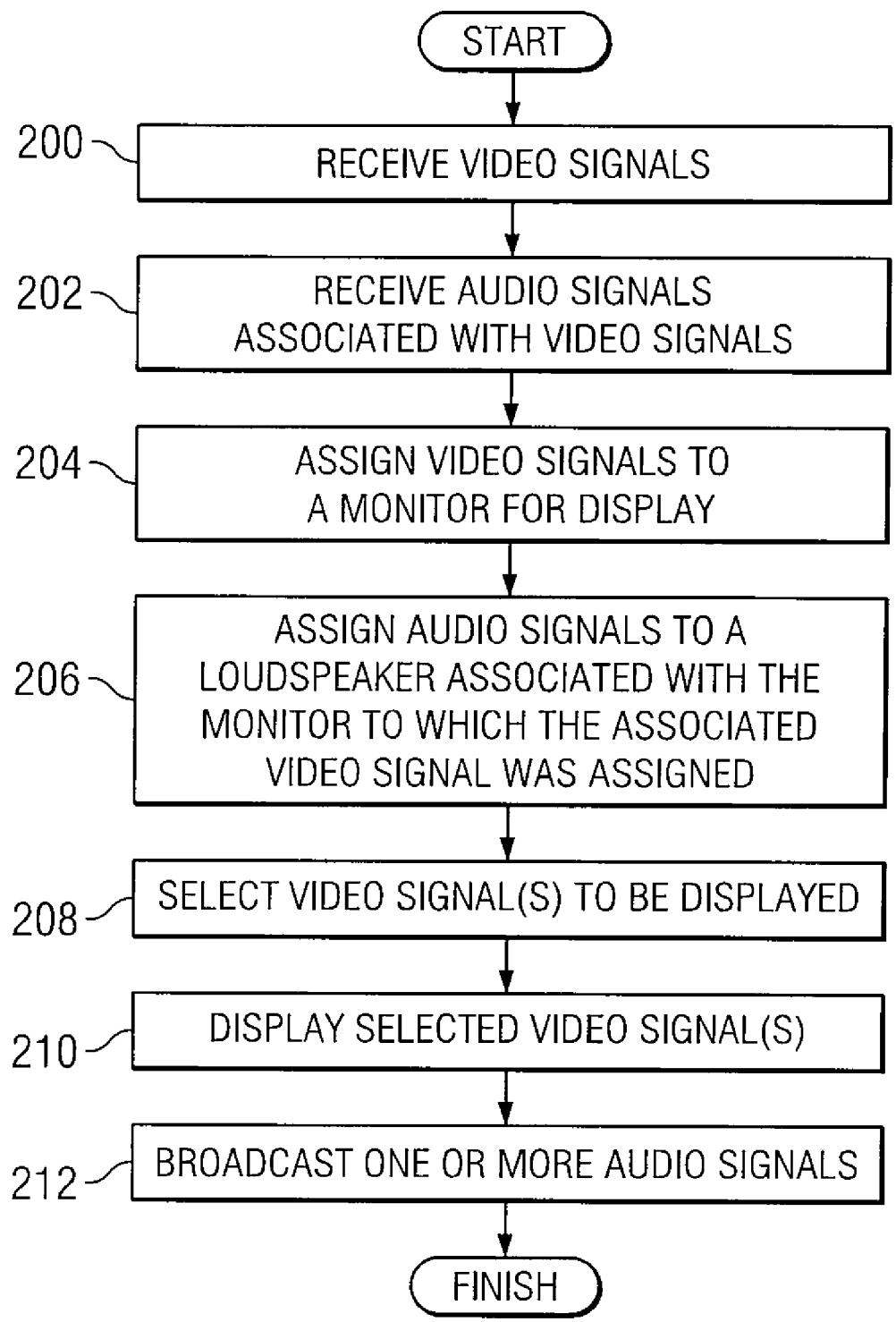
FIG. 2 is a flowchart illustrating a method for displaying a multipoint videoconference in accordance with a particular embodiment.

Referring now to FIG. 2, a flow chart illustrating a method for displaying a videoconference in accordance with a particular embodiment is provided. The method begins at step 200 where a plurality of video signals are received. The video signals may be for display on a plurality of monitors at a local site and may be generated by cameras at a remote conference site. At step 202 a plurality of audio signals are received. In certain embodiments, each audio signal may have an associated video signal.

Next, at step 204 the video signals are assigned. In an embodiment, each of the video signals generated at a particular remote site may be assigned to the same local monitor. At step 206 the audio signals are assigned. An audio signal may be assigned to a loudspeaker associated with the monitor to which the audio signal's associated video signal was assigned.

At step 208, for each monitor, a video signal may be selected for display. The selection may be based on numerous factors including, but not limited to, the video signal associated with the segment that is associated with the conference participant that is currently speaking. In situations where a monitor is assigned multiple video signals that are associated with segments having participants that are currently speaking, the selection may be based on the video signal associated with the participant speaking the longest. If a particular monitor is not currently assigned a video signal associated with a segment having a participant that is currently speaking, then the selection may be based on the video signal associated with the last participant to speak.

In certain embodiments, the selected signal is dynamic. Accordingly, the video signal selected for display may be switched according to the above recited factors used for the initial selection. As an example, the video signal may be switched to the video signal associated with the audio signal having the highest audio level. The audio level may be measured in decibels and may indicate that the microphone which generated the audio signal is associated with the active speaker.

At step 210, each of the selected video signals are displayed on its respective monitor. Similarly, at step 212, one or more of the audio signals may be broadcasted on an assigned loudspeaker. In certain embodiments, each of the audio signals assigned to a particular loudspeaker may be broadcasted simultaneously. This broadcasting scheme may prevent local conference participants from missing communications from remote participants. In another embodiment, the audio signal associated with a selected video signal may be amplified. Alternatively, the audio signals which are not associated with a selected video signal may be muted. In another embodiment, the audio signal which is broadcasted is the signal having the highest audio level.

Modifications, additions, or omissions may be made to the method depicted in FIG. 2. In certain embodiments, the method may include more, fewer, or other steps. Additionally, steps may be performed in any suitable order without departing from the scope of the disclosure.

While certain embodiments have been described in detail with reference to particular embodiments, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. A method, comprising:
receiving a plurality of video signals generated at a plurality of remote conference sites;
assigning a plurality of video signals generated at a first remote conference site to a first monitor of a plurality of monitors at a local site;
assigning a plurality of video signals generated at a second remote conference site to a second monitor of the plurality of monitors at the local site;
selecting a video signal of the plurality of video signals assigned to the plurality of monitors for each of the first and second monitors; and
displaying each selected video signal on its respective monitor.

2. The method of claim 1, further comprising:
receiving a plurality of audio signals generated at the plurality of remote sites, each of the plurality of audio signals associated with at least one of the plurality of video signals;
assigning a plurality of audio signals generated at the first remote site to a first loudspeaker associated with the first monitor;
assigning a plurality of audio signals generated at the second remote site to a second loudspeaker associated with the second monitor; and
broadcasting one or more of the assigned audio signals.

3. The method of claim 2, wherein the only broadcasted audio signals are the audio signals associated with each selected video signal for each of the first and second loudspeakers.

4. The method of claim 2, wherein at least one of the broadcasted audio signals is the audio signal associated with the selected video signal for each of the first and second loudspeakers, the method including amplifying the broadcasted audio signals associated with each selected video signal.

5. The method of claim 2, wherein at least one of the broadcasted audio signals is the audio signal associated with the selected video signal for each of the first and second loudspeakers, the method including muting each broadcasted audio signal that is not associated with a selected video signal.

6. The method of claim 2, wherein the broadcasted audio signal is the audio signal having the highest audio level.

7. The method of claim 1, further comprising:
switching between the plurality of video signals assigned to the monitors for each of the first and second monitors.

8. The method of claim 7, wherein switching between the plurality of video signals assigned to the first and second monitors includes switching to the video signal associated with the audio signal having the highest audio level.

9. A system, comprising:
an interface operable to receive a plurality of video signals generated at a plurality of remote conference sites;
a plurality of monitors at a local site, the plurality of monitors operable to display one or more of the plurality of video signals; and
a processor coupled to the interface and operable to:
assign a plurality of video signals generated at a first remote conference site to a first monitor of the plurality of monitors at the local site;
assign a plurality of video signals generated at a second remote conference site to a second monitor of the plurality of monitors at the local site;
select, a video signal of the plurality of video signals assigned to the monitors for each of the first and second monitors; and display each selected video signal on its respective monitor.

10. The system of claim 9, wherein:
the interface is operable to receive a plurality of audio signals generated at the plurality of remote sites, each of the plurality of audio signals associated with at least one of the plurality of video signals; and
the processor is operable to:
assign a plurality of audio signals generated at the first remote site to a first loudspeaker associated with the first monitor;
assign a plurality of audio signals generated at the second remote site to a second loudspeaker associated with the second monitor; and
broadcast one or more of the assigned audio signals.

11. The system of claim 10, wherein the only broadcasted audio signals are the audio signals associated with each selected video signal for each of the first and second loudspeakers.

12. The system of claim 10, wherein at least one of the broadcasted audio signals is the audio signal associated with the selected video signal for each of the first and second loudspeakers, the processor operable to amplify the audio signals associated with each selected video signal.

13. The system of claim 10, wherein at least one of the broadcasted audio signals is the audio signal associated with the selected video signal for each of the first and second loudspeakers, the processor operable to mute each broadcasted audio signal that is not associated with a selected video signal.

14. The system of claim 10, wherein the broadcasted audio signal is the audio signal having the highest audio level.

15. The system of claim 9, wherein the processor is operable to switch between the plurality of video signals assigned to the monitors for each of the first and second monitors.

16. The system of claim 15, wherein a processor operable to switch between the plurality of video signals assigned to the first and second monitors includes a processor operable to the video signal associated with the audio signal having the highest audio level.

17. Logic embodied in a non-transitory computer readable medium, the computer readable medium comprising code operable to:
receive a plurality of video signals generated at a plurality of remote conference sites;
assign a plurality of video signals generated at a first remote conference site to a first monitor of a plurality of monitors at the local site;
assign a plurality of video signals generated at a second remote conference site to a second monitor of the plurality of monitors at the local site;
select a video signal of the plurality of video signals assigned to the monitors for each of the first and second monitor; and
display each selected video signal on its respective monitor.

18. The logic of claim 17, wherein the code is further operable to:
receive a plurality of audio signals generated at the plurality of remote sites, each of the plurality of audio signals associated with at least one of the plurality of video signals;
assign a plurality of audio signals generated at the first remote site to a first loudspeaker associated with the first monitor;
assign a plurality of audio signals generated at the second remote site to a second loudspeaker associated with the second monitor; and
broadcast one or more of the assigned audio signals.

19. The logic of claim 18, wherein the only broadcasted audio signals are the audio signals associated with each selected video signal for each of the first and second loudspeakers.

20. The logic of claim 18, wherein at least one of the broadcasted audio signals is the audio signal associated with the selected video signal for each of the first and second loudspeakers, the code operable to amplify the audio signals associated with each selected video signal.

21. The logic of claim 18, wherein at least one of the broadcasted audio signals is the audio signal associated with the selected video signal for each of the first and second loudspeakers, the code operable to mute each broadcasted audio signal that is not associated with a selected video signal.

22. The logic of claim 18, wherein the broadcasted audio signal is the audio signal having the highest audio level.

23. The logic of claim 17, wherein the code is further operable to switch between the plurality of video signals assigned to the monitors for each of the first and second monitors.

24. The logic of claim 23, wherein the code is further operable to switch between a plurality of video signals assigned to the first and second monitors includes code operable to the video signal associated with the audio signal having the highest audio level.

25. A system comprising:
means for receiving a plurality of video signals generated at a plurality of remote conference sites;
means for assigning a plurality of video signals generated at a first remote conference site to a first monitor of a plurality of monitors at a local site;
means for assigning a plurality of video signals generated at a second remote conference site to a second monitor of the plurality of monitors at the local site;
means for selecting, for each of the first and second monitor, a video signal of the plurality of video signals assigned to the monitor; and
means for displaying each selected video signal on its respective monitor.

* * * * *